W. B. McELNEY.
DIES FOR FORGING CARRIAGE-SHAFT EYES.
No. 171,151. Patented Dec. 14, 1875.
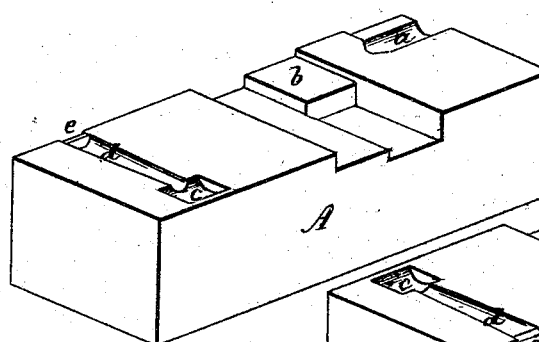
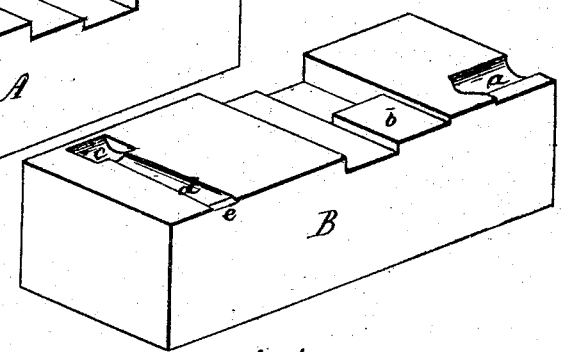
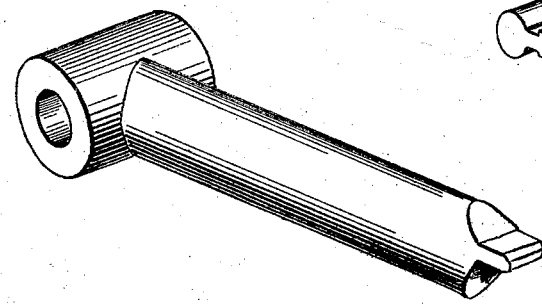
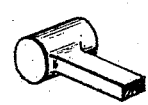
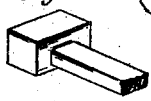

UNITED STATES PATENT OFFICE.

WILLIAM B. McELNEY, OF WEST MERIDEN, CONN., ASSIGNOR OF ONE-HALF HIS RIGHT TO BEECHER MANUFACTURING COMPANY, OF SAME PLACE.

IMPROVEMENT IN DIES FOR FORGING CARRIAGE-SHAFT EYES.

Specification forming part of Letters Patent No. 171,151, dated December 14, 1875; application filed August 9, 1875.

*To all whom it may concern:*

Be it known that I, WILLIAM B. MCELNEY, of West Meriden, in the county of New Haven and State of Connecticut, have invented a new Improvement in Dies for Forging Carriage-Shaft Eyes; and I do hereby declare the following, when taken in connection with the accompanying drawings and the letters of reference marked thereon, to be a full, clear, and exact description of the same, and which said drawings constitute part of this specification, and represent, in—

Figure 1, perspective view of one part; Fig. 2, perspective view of the other part; Fig. 3, perspective view of a shaft-eye.

This invention relates to the construction of dies for making the article known to the trade as "shaft-eyes"—that is to say, the eye by which carriage-shafts or the pole are attached to the shackles on the axle.

The object of this invention is to construct a die for producing this article; and the invention consists in a die, as shown in the accompanying drawings, and as hereinafter described.

The two parts A and B are substantially alike. The one part is stationary, and the other forced upon that, as in the usual manner for forging by dies. The cavity *a* in each is of semicircular form in transverse section, and is employed to make the first break in the bar, to partially form the head, as seen in Fig. 4. Removed from this, the shank part is placed upon the plain surface *b*, and there broken down or drawn out, as seen in Fig. 5, and then the partially-formed head and shank are set into the finishing-cavity, in which the head part *c* is a semicircular cavity, and with a cavity, *d*, extending therefrom in each part, corresponding to one-half the shank of the eye that is above and below the longitudinal plane of the eye. The outer ends of these cavities, as at *e*, are formed to bring the end of the shank into convenient form for welding, as seen in Fig. 3, and at the same time to nearly separate the shank from the bar. This constitutes the chief characteristic of this invention. This shapes the article, which is subsequently trimmed, and the head perforated for the bolt.

In forging some classes of shaft-eyes the shaping-cavity *a* may be dispensed with, the break-down *b* being sufficient to prepare the blank for the cavity—that is, leaving the head substantially square, as seen in Fig. 6.

The several dies may be formed separately and used successively; but I prefer to make them in connection, as before described.

These articles, thus produced, are furnished to manufacturers, who weld them to the shaft-straps.

I am aware of the patent of Henry M. Beecher, April 30, 1872, for a similar invention, that patent being the property of the assignee of this invention, and this being for an improvement upon that.

I claim—

The shaping-die *c d*, constructed at the shank end with the abutments *e e*, substantially as described, whereby the shank is shaped for welding and nearly separated from the bar.

WM. B. McELNEY.

Witnesses:
SILAS W. KENT,
ORVILLE H. PLATT.